(12) United States Patent
Morimoto et al.

(10) Patent No.: US 12,184,098 B2
(45) Date of Patent: Dec. 31, 2024

(54) POWER SUPPLY DEVICE

(71) Applicant: Yazaki Corporation, Tokyo (JP)

(72) Inventors: Mitsuaki Morimoto, Susono (JP);
Kazuo Sugimura, Susono (JP);
Hiroteru Kato, Susono (JP); Shoya Watanabe, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 3 days.

(21) Appl. No.: 18/322,053

(22) Filed: May 23, 2023

(65) Prior Publication Data

US 2023/0396076 A1 Dec. 7, 2023

(30) Foreign Application Priority Data

Jun. 6, 2022 (JP) ................................ 2022-091417

(51) Int. Cl.
*H02J 7/00* (2006.01)
(52) U.S. Cl.
CPC ................... *H02J 7/0013* (2013.01)
(58) Field of Classification Search
CPC .................................................. H02J 7/0013
See application file for complete search history.

(56) References Cited

U.S. PATENT DOCUMENTS

| | | | | |
|---|---|---|---|---|
| 2015/0070023 A1* | 3/2015 | Kudo | ................... | G01R 31/396 324/426 |
| 2016/0049813 A1 | 2/2016 | Takizawa et al. | | |
| 2017/0170671 A1 | 6/2017 | Mergener et al. | | |
| 2024/0036120 A1* | 2/2024 | Zhou | ................... | G01R 31/3835 |
| 2024/0106367 A1* | 3/2024 | Tani | ........................ | H02P 27/06 |
| 2024/0128519 A1* | 4/2024 | Iwane | .................... | H02J 7/0048 |
| 2024/0146073 A1* | 5/2024 | von Novak | ........... | H02J 7/0019 |
| 2024/0178697 A1* | 5/2024 | Morii | ..................... | H02J 7/0031 |
| 2024/0186811 A1* | 6/2024 | Namuduri | ........... | H02M 7/5387 |

FOREIGN PATENT DOCUMENTS

| | | |
|---|---|---|
| JP | 2019-80473 A | 5/2019 |
| JP | 2019-80474 A | 5/2019 |
| JP | 2020-150784 A | 9/2020 |

\* cited by examiner

*Primary Examiner* — Jared Fureman
*Assistant Examiner* — Esayas G Yeshaw
(74) *Attorney, Agent, or Firm* — Sughrue Mion, PLLC

(57) ABSTRACT

A positive electrode-side input terminal is connected to a first positive electrode-side battery terminal, a negative electrode-side input terminal is connected to a second negative electrode-side battery terminal, a first switch is connected between a first negative electrode-side battery terminal and a second positive electrode-side battery terminal, a second switch is connected between a second positive electrode-side battery terminal and a first connection point between the positive electrode-side input terminal and the first positive electrode-side battery terminal, a third switch is connected between the first negative electrode-side battery terminal and a second connection point between the negative electrode-side input terminal and the second negative electrode-side battery terminal, a positive electrode-side output terminal is connected to a line connecting the second switch and the second positive electrode-side battery terminal, and a negative electrode-side output terminal to a line connecting the negative electrode-side input terminal and the second negative electrode-side battery terminal.

10 Claims, 13 Drawing Sheets

POWER SUPPLY DEVICE

TECHNICAL FIELD

The present invention relates to a power supply device.

BACKGROUND

Electric vehicles (EV) and plug-in hybrid vehicles have become popular, and charging facilities capable of charging batteries of the electric vehicles have also become popular. There are various kinds of standards for the charging facilities that are currently installed, thus a power supply device of an electric vehicle needs to adapt to several standards of charging devices. For example, Patent Document 1 discloses a power supply device configured to switch connection of two batteries between parallel connection and series connection to adapt to a fast charger and to an ultra-fast charger in which voltage of supplied power is higher than that of the fast charger.

RELATED ART DOCUMENT

Patent Document

Patent Document 1: JP 2020-150784 A

SUMMARY OF THE INVENTION

Problem to be Solved by the Invention

However, in the power supply device disclosed in Patent Document 1, when the connection of the two batteries is switched, voltage applied to a load varies significantly. Thus, in the power supply device disclosed in Patent Document 1, the load cannot be operated during this switching of the connection of the two batteries.

In view of the problem described above, an object of the present invention is to provide a power supply device that is configured to adapt to a plurality of chargers without requiring interruption of operation of a load.

Solution to Problem

To solve the above problem and achieve the object described above, a power supply device according to one embodiment of the present invention includes a first positive electrode-side battery terminal and a first negative electrode-side battery terminal for connecting a battery, a second positive electrode-side battery terminal and a second negative electrode-side battery terminal for connecting a battery, a positive electrode-side input terminal and a negative electrode-side input terminal for connecting a charger, a positive electrode-side output terminal and a negative electrode-side output terminal for connecting a load, a first switch, a second switch, and a third switch, wherein the positive electrode-side input terminal is connected to the first positive electrode-side battery terminal, the negative electrode-side input terminal is connected to the second negative electrode-side battery terminal, the first switch is connected between the first negative electrode-side battery terminal and the second positive electrode-side battery terminal, the second switch is connected between a first connection point and the second positive electrode-side battery terminal, the first connection point being between the positive electrode-side input terminal and the first positive electrode-side battery terminal, the third switch is connected between the first negative electrode-side battery terminal and a second connection point, the second connection point being between the negative electrode-side input terminal and the second negative electrode-side battery terminal, the positive electrode-side output terminal is connected to a line that connects the second switch and the second positive electrode-side battery terminal, and the negative electrode-side output terminal is connected to a line that connects the negative electrode-side input terminal and the second negative electrode-side battery terminal.

A power supply device according to one embodiment of the present invention includes a first positive electrode-side battery terminal and a first negative electrode-side battery terminal for connecting a battery, a second positive electrode-side battery terminal and a second negative electrode-side battery terminal for connecting a battery, a positive electrode-side input terminal and a negative electrode-side input terminal for connecting a charger, a positive electrode-side output terminal and a negative electrode-side output terminal for connecting a load, a first switch, a second switch, and a third switch, wherein the positive electrode-side input terminal is connected to the first positive electrode-side battery terminal, the negative electrode-side input terminal is connected to the second negative electrode-side battery terminal, the first switch is connected between the first negative electrode-side battery terminal and the second positive electrode-side battery terminal, the second switch is connected between a first connection point and the second positive electrode-side battery terminal, the first connection point being between the positive electrode-side input terminal and the first positive electrode-side battery terminal, the third switch is connected between the first negative electrode-side battery terminal and a second connection point, the second connection point being between the negative electrode-side input terminal and the second negative electrode-side battery terminal, the positive electrode-side output terminal is connected to a line that connects the positive electrode-side input terminal and the first positive electrode-side battery terminal, and the negative electrode-side output terminal is connected to a line that connects the first negative electrode-side battery terminal and the third switch.

A power supply device according to one embodiment of the present invention includes a first positive electrode-side battery terminal and a first negative electrode-side battery terminal for connecting a battery, a second positive electrode-side battery terminal and a second negative electrode-side battery terminal for connecting a battery, a positive electrode-side input terminal and a negative electrode-side input terminal for connecting a charger, a positive electrode-side output terminal and a negative electrode-side output terminal for connecting a load, a first switch, a second switch, and a third switch, wherein, the positive electrode-side input terminal is connected to the first positive electrode-side battery terminal, the negative electrode-side input terminal is connected to the second negative electrode-side battery terminal, the first switch is connected between the first negative electrode-side battery terminal and the second positive electrode-side battery terminal, the second switch is connected between a first connection point and the second positive electrode-side battery terminal, the first connection point being between the positive electrode-side input terminal and the first positive electrode-side battery terminal, the third switch is connected between the first negative electrode-side battery terminal and a second connection point, the second connection point being between the negative electrode-side input terminal and the second negative electrode-side battery terminal, the second switch and the third switch are constituted of two switching elements connected in series, the positive electrode-side output terminal is connected to a line that connects the two switching elements constituting the second switch, and the negative electrode-side output terminal is connected to a line that connects the two switching elements constituting the third switch.

Advantageous Effect of the Invention

According to the present invention, it is possible to provide a power supply device that is configured to adapt to a plurality of chargers without requiring interruption of operation of a load.

DETAILED DESCRIPTION OF PREFERRED EMBODIMENTS

<Power Supply Device 100>

Figure 1:
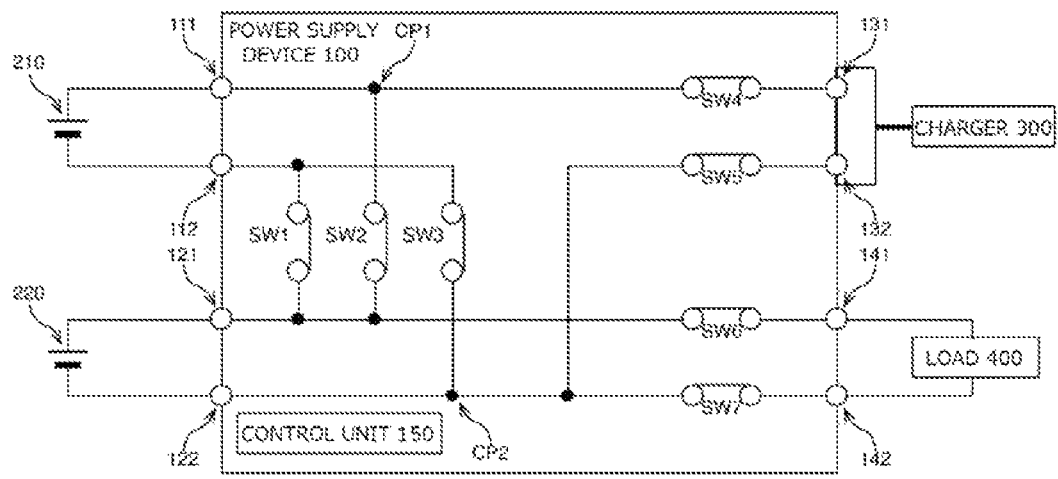
FIG. 1 is a diagram illustrating a power supply device 100 according to one embodiment of the present invention.
Figure 2:
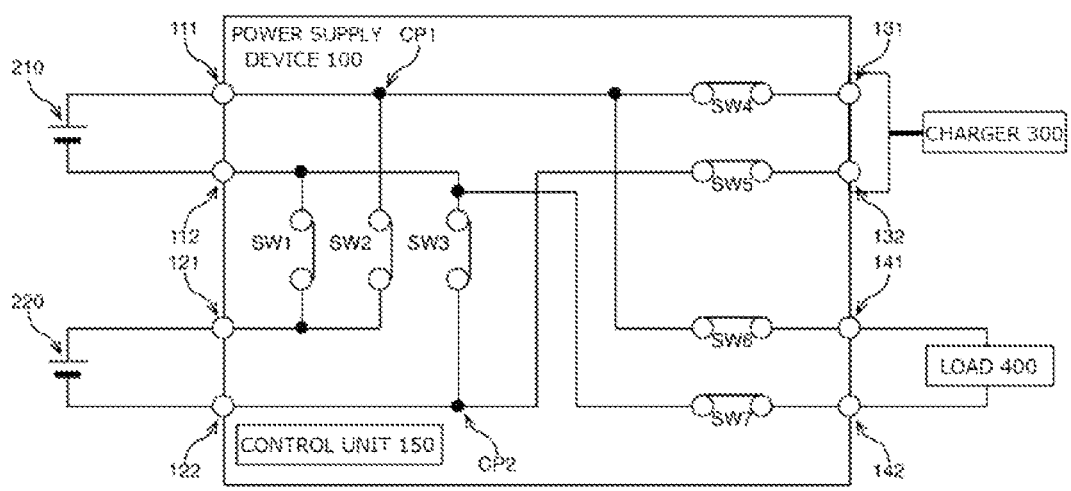
FIG. 2 is a diagram illustrating a power supply device 100 according to one embodiment of the present invention.

FIG. 1 and FIG. 2 are diagrams illustrating a power supply device 100 according to one embodiment of the present invention, respectively. The power supply device 100 includes a first positive electrode-side battery terminal 111, a first negative electrode-side battery terminal 112, a second positive electrode-side battery terminal 121, a second negative electrode-side battery terminal 122, a positive electrode-side input terminal 131, a negative electrode-side input terminal 132, a first switch SW1, a second switch SW2, a third switch SW3, a positive electrode-side output terminal 141, and a negative electrode-side output terminal 142.

The first positive electrode-side battery terminal 111 and the first negative electrode-side battery terminal 112 are terminals for connecting a first battery 210. A positive electrode of the first battery 210 is connected to the first positive electrode-side terminal 111, and a negative electrode of the first battery 210 is connected to the first negative electrode-side battery terminal 112. The second positive electrode-side battery terminal 121 and the second negative electrode-side battery terminal 122 are terminals for connecting a second battery 220. A positive electrode of the second battery 220 is connected to the second positive electrode-side terminal 121, and a negative electrode of the second battery 220 is connected to the second negative electrode-side battery terminal 122. The first battery 210 and the second battery 220 are rechargeable batteries which can be charged with and discharge electric power, such as lithium-ion batteries. Drive voltages of the first battery 210 and the second battery 220 are the same and are a first voltage (for example, 400V or 500V).

The positive electrode-side input terminal 131 and the negative electrode-side input terminal 132 are terminals for connecting a charger 300. When a first charger 300A (for example, a fast charger) for supplying electric power with the first voltage is connected to the positive electrode-side input terminal 131 and the negative electrode-side input terminal 132, the electric power with the first voltage is input from the positive electrode-side input terminal 131 and the negative electrode-side input terminal 132. When a second charger 300B (for example, an ultra-fast charger) for supplying electric power with a second voltage (for example, 800V or 1000V) that is a voltage twice the first voltage is connected to the positive electrode-side input terminal 131 and the negative electrode-side input terminal 132, the electric power with the second voltage is input from the positive electrode-side input terminal 131 and the negative electrode-side input terminal 132.

In this embodiment, the positive electrode-side input terminal 131 is connected to the first positive electrode-side battery terminal 111, and the negative electrode-side input terminal 132 is connected to the second negative electrode-side battery terminal 122.

The first switch SW1 is connected between the first negative electrode-side battery terminal 112 and the second positive electrode-side battery terminal 121. The second switch SW2 is connected between the second positive electrode-side battery terminal 121 and a first connection point CP1, the first connection point CP1 being between the positive electrode-side input terminal 131 and the first positive electrode-side battery terminal 111. A third switch SW3 is connected between the first negative electrode-side battery terminal 112 and a second connection point CP2, the second connection point CP2 being between the negative electrode-side input terminal 132 and the second negative electrode-side battery terminal 122.

Figure 3:
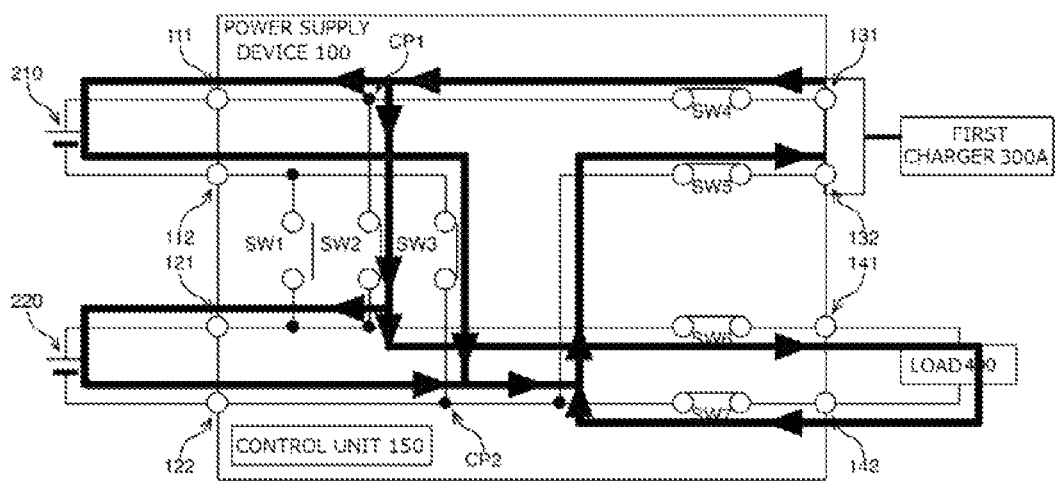
FIG. 3 is a diagram for explaining a flow of electric power in the power supply device 100.
Figure 4:
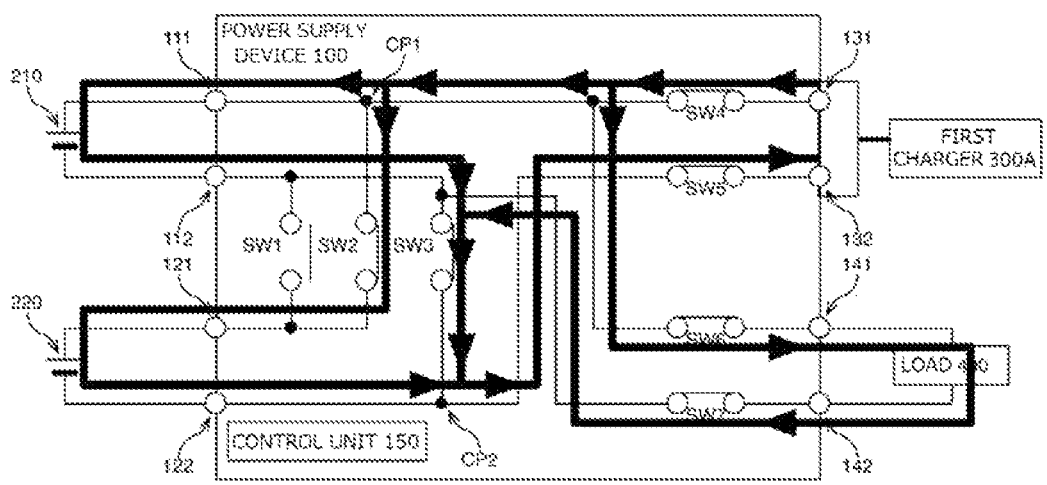
FIG. 4 is a diagram for explaining a flow of electric power in the power supply device 100.

Thus, in this embodiment, as shown in FIG. 3 and FIG. 4, in a state where the first switch SW1 is opened and the second switch SW2 and the third switch SW3 are closed, the first battery 210 and the second battery 220 are connected in parallel between the positive electrode-side input terminal 131 and the negative electrode-side input terminal 132. Consequently, as shown in FIG. 3 and FIG. 4, when the charger is connected to the positive electrode-side input terminal 131 and the negative electrode-side input terminal 132 in a state where the first switch SW1 is opened and the second switch SW2 and the third switch SW3 are closed, it is possible to charge with the first battery 210 and the second battery 220 connected in parallel.

Thus, in this embodiment, when the first charger 300A (for example, a fast charger) is connected to the positive electrode-side input terminal 131 and the negative electrode-side input terminal 132, the first switch SW1 is opened and the second switch SW2 and the third switch SW3 are closed so that the first battery 210 and the second battery 220 are charged with these batteries connected in parallel. In this way, in this embodiment, the first battery 210 and the second battery 220 can be charged with the electric power with the first voltage that is the drive voltage of the first battery 210 and the second battery 220.

Figure 5:
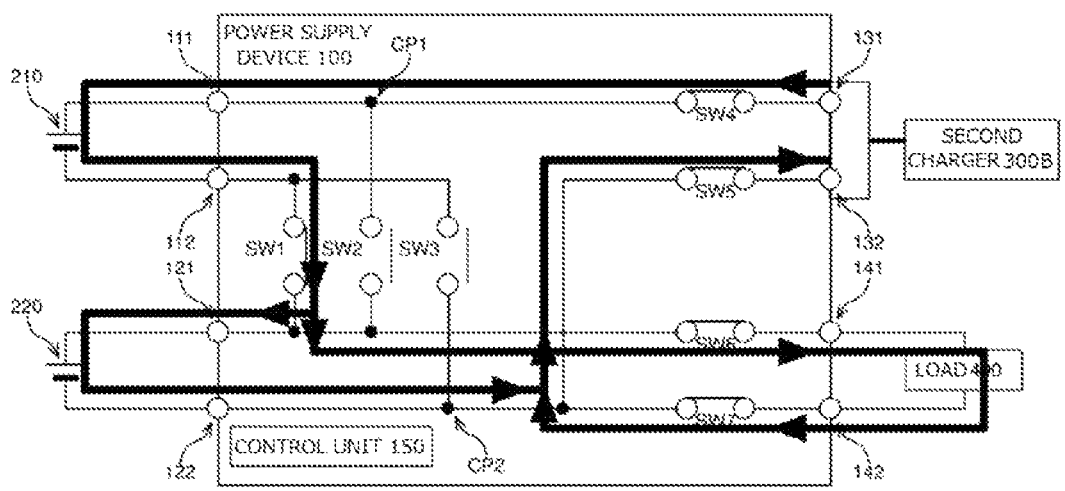
FIG. 5 is a diagram for explaining a flow of electric power in the power supply device 100.
Figure 6:
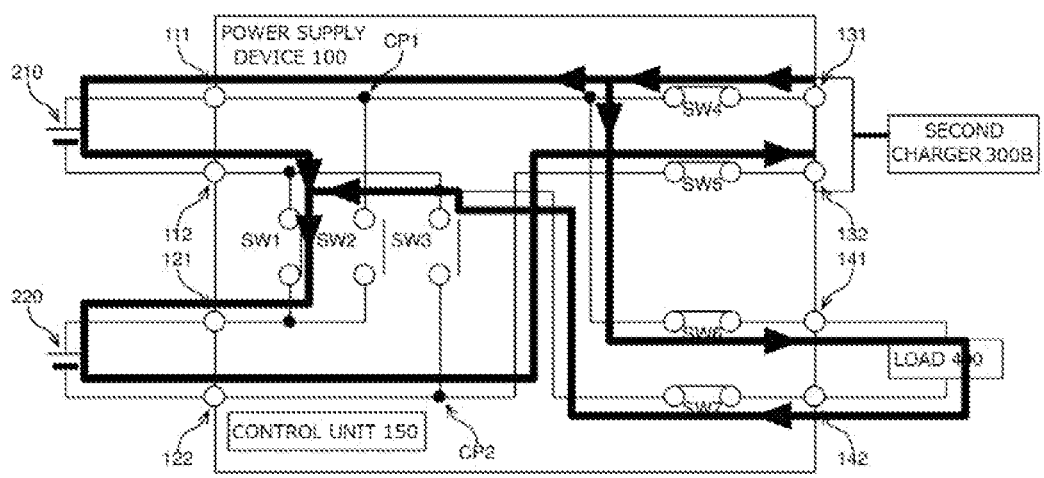
FIG. 6 is a diagram for explaining a flow of electric power in the power supply device 100.

Further, in this embodiment, as shown in FIG. 5 and FIG. 6, in a state where the first switch SW1 is closed and the second switch SW2 and the third switch SW3 are opened, the first battery 210 and the second battery 220 are connected in series between the positive electrode-side input terminal 131 and the negative electrode-side input terminal 132. Consequently, as shown in FIG. 5 and FIG. 6, when the charger 300 is connected to the positive electrode-side input terminal 131 and the negative electrode-side input terminal 132 in a state where the first switch SW1 is closed and the second switch SW2 and the third switch SW3 are opened, it is possible to charge with the first battery 210 and the second battery 220 connected in series.

Thus, in this embodiment, when the second charger 300B (for example, an ultra-fast charger) is connected to the positive electrode-side input terminal 131 and the negative electrode-side input terminal 132, the first switch SW1 is closed and the second switch SW2 and the third switch SW3 are opened so that the first battery 210 and the second battery 220 are charged with these batteries connected in series. In this way, in this embodiment, the first battery 210 and the second battery 220 can be charged with the electric power with the first voltage that is half the voltage of the second voltage, i.e., the electric power with the first voltage that is the drive voltage of the first battery 210 and the second battery 220.

The positive electrode-side output terminal 141 and the negative electrode-side output terminal 142 are terminals for connecting a load 400, a drive voltage of the load 400 being the first voltage.

In this embodiment, the positive electrode-side output terminal 141 and the negative electrode-side output terminal 142 are connected such that the voltages of the first battery 210 and the second battery 220 whose drive voltages are the same as that of the load 400 are applied to the load 400, regardless of the opening/closing state of the first to third switches SW1-SW3. Thus, in this embodiment, even when the opening/closing state of the first to third switches SW1-SW3 is switched, the voltage applied to the load 400 does not change significantly. Consequently, in this embodiment, even when the connection between the first battery 210 and the second battery 220 is switched, the load 400 can be operated without significant change in the voltage applied to the load 400. This embodiment can provide the power supply device that can adapt to the plurality of chargers without requiring interruption of operation of the load.

In the example shown in FIG. 1, the positive electrode-side output terminal 141 is connected to a line that connects the second switch SW2 and the second positive electrode-side battery terminal 121, and the negative electrode-side output terminal 142 is connected to a line that connects the negative electrode-side input terminal 132 and the second negative electrode-side battery terminal 122.

Figure 7:
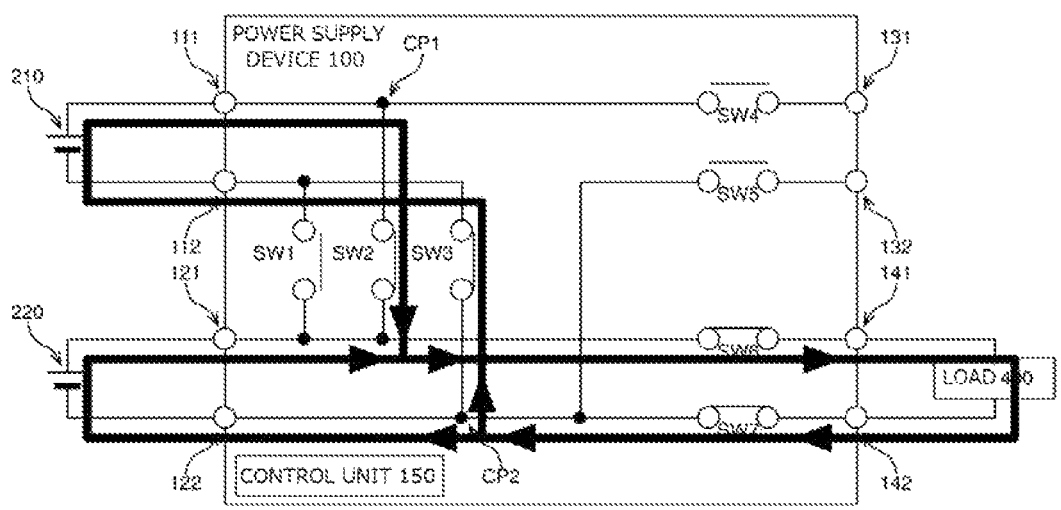
FIG. 7 is a diagram for explaining a flow of electric power in the power supply device 100.

Thus, in the example shown in FIG. 1, the load 400 is applied with the voltage of the second battery 220 regardless of the opening/closing state of the first to third switches SW1-SW3, as shown in FIG. 3, FIG. 5 and FIG. 7. Accordingly, in the example shown in FIG. 1, the electric power with the voltage of the second battery 220 is supplied to the load 400 regardless of the opening/closing state of the first to third switches SW1-SW3.

In FIG. 3, the load 400 is connected in parallel with the first battery 210 and the second battery 220, and the electric power with the voltage of the second battery 220 is supplied to the load 400 from the first charger 300A. In FIG. 5, the load 400 is connected in parallel with the second battery 220 so the electric power with the voltage of the second battery 220 is supplied to the load 400 from the second charger 300B.

FIG. 7 shows an example of a state where the charger 300 is not connected to the positive electrode-side input terminal 131 and the negative electrode-side input terminal 132 (for example, during traveling), and in FIG. 7, the first switch SW1 is opened, and the second switch SW2 and the third switch SW3 are closed. Thus, the first battery 210 and the second battery 220 are connected in parallel, and the electric power with the voltage of the second battery 220 is supplied to the load 400 from the first battery 210 and the second battery 220.

On the other hand, in the example shown in FIG. 2, the positive electrode-side output terminal 141 is connected to a line that connects the positive electrode-side input terminal 131 and the first positive electrode-side battery terminal 111, and the negative electrode-side output terminal 142 is connected to a line that connects the first negative electrode-side battery terminal 112 and the third switch SW3.

Figure 8:
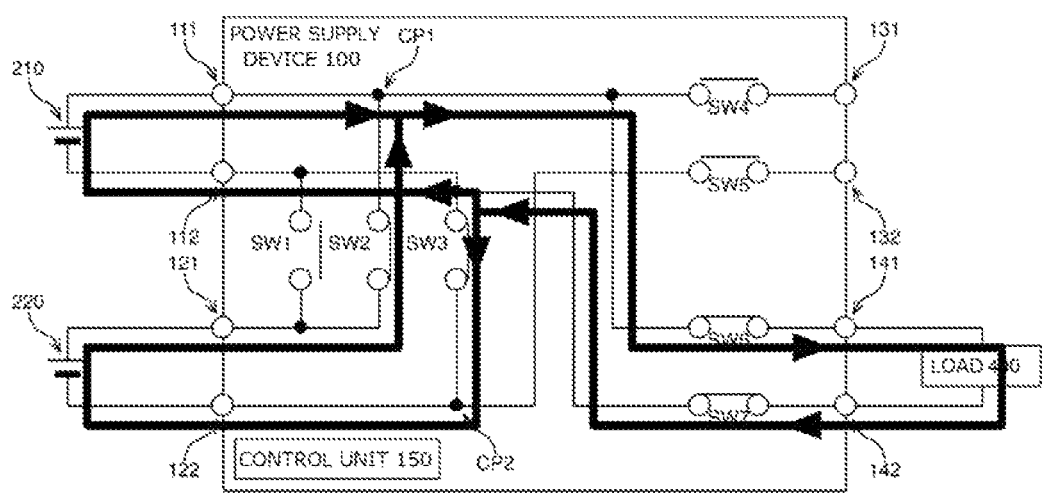
FIG. 8 is a diagram for explaining a flow of electric power in the power supply device 100.

Thus, in the example shown in FIG. 2, the load 400 is applied with the voltage of the first battery 210 regardless of the opening/closing state of the first to third switches SW1-SW3, as shown in FIG. 4, FIG. 6 and FIG. 8. Accordingly, in the example shown in FIG. 2, the electric power with the voltage of the first battery 210 is supplied to the load 400 regardless of the opening/closing state of the first to third switches SW1-SW3.

In FIG. 4, the load 400 is connected in parallel with the first battery 210 and the second battery 220, and the electric power with the voltage of the first battery 210 is supplied to the load 400 from the first charger 300A. In FIG. 6, the load 400 is connected in parallel with the first battery 210 so the electric power with the voltage of the first battery 210 is supplied to the load 400 from the second charger 300B.

FIG. 8 shows an example of a state where the charger 300 is not connected to the positive electrode-side input terminal 131 and the negative electrode-side input terminal 132 (for example, during traveling). In FIG. 8, the first switch SW1 is opened, and the second switch SW2 and the third switch SW3 are closed. Thus, the first battery 210 and the second battery 220 are connected in parallel, and the electric power with the voltage of the first battery 210 is supplied to the load 400 from the first battery 210 and the second battery 220.

<Control of the First to Third Switches SW1-SW3>

The power supply device 100 may further include a control unit 150 that controls the first switch SW1, the second switch SW2 and the third switch SW3.

The control unit 150 may be configured, for example, to control so that the first switch SW1 is opened and the second switch SW2 and the third switch SW3 are closed when the charger 300 is not connected to the positive electrode-side input terminal 131 and the negative electrode-side input terminal 132, as shown in FIG. 7 and FIG. 8. In this way, the first battery 210 and the second battery 220 can be connected in parallel, allowing the electric power to be supplied to the load 400 from both the first battery 210 and the second battery 220.

The control unit 150 may be configured, for example, to control so that the first switch SW1 is opened and the second switch SW2 and the third switch SW3 are closed when the first charger 300A is connected to the positive electrode-side input terminal 131 and the negative electrode-side input terminal 132, as shown in FIG. 3 and FIG. 4. In this way, the first battery 210, the second battery 220 and the load 400 can be connected in parallel, so it is possible to supply the electric power with the first voltage from the first charger 300A to the first battery 210, to the second battery 220 and to the load 400.

The control unit 150 may be configured, for example, to control so that the first switch SW1 is closed and the second switch SW2 and the third switch SW3 are opened when the second charger 300B is connected to the positive electrode-side input terminal 131 and the negative electrode-side input terminal 132, as shown in FIG. 5 and FIG. 6. In this way, the first battery 210 and the second battery 220 can be connected in series, and the load can be connected in parallel with the first battery 210 or the second battery 220, so it is possible to supply to the load 400 the electric power with the voltage of the first battery 210 or the second battery 220.

Further, the control unit 150 may be configured, for example, to control such that the first switch SW1 is closed and the second switch SW2 and the third switch SW3 are opened when the second charger 300B is connected to the positive electrode-side input terminal 131 and the negative electrode-side input terminal 132, as shown in FIG. 5 and FIG. 6, so that the first battery 210 and the second battery 220 are connected in series, and subsequently control such that, when the voltage of the first battery 210 has reached a predetermined voltage value close to an upper limit voltage value of the first battery 210, the first switch SW1 and the third switch SW3 are opened, and the second switch SW2 is closed. In this way, only the second battery 220 can be charged so that any imbalance between the voltage of the first battery 210 and the voltage of the second battery 220 can be eliminated.

As shown in FIG. 1 and FIG. 2, a fourth switch SW4 may be provided at the positive electrode-side input terminal 131, and a fifth switch SW5 may be provided at the negative electrode-side input terminal 132. Further, the control unit 150 may be configured to control the fourth switch SW4 and the fifth switch SW5.

In this case, the control unit 150 may be configured to control the fourth switch SW4 and the fifth switch SW5 such that, when the charger 300 is connected to the positive electrode-side input terminal 131 and the negative electrode-side input terminal 132, the fourth switch SW4 and the fifth switch SW5 are closed, as shown in FIG. 3 to FIG. 6, and when the charger 300 is not connected to the positive electrode-side input terminal 131 and the negative electrode-side input terminal 132, the fourth switch SW4 and the fifth switch SW5 are opened, as shown in FIG. 7 and FIG. 8. In this way, when the charger 300 is not connected to the positive electrode-side input terminal 131 and the negative electrode-side input terminal 132, the positive electrode-side input terminal 131 and the negative electrode-side input terminal 132 can be separated from the first battery 210 and the second battery 220.

Further, as shown in FIG. 1 and FIG. 2, a sixth switch SW6 may be provided at the positive electrode-side output terminal 141, and a seventh switch SW7 may be provided at the negative electrode-side output terminal 142. Further, the control unit 150 may be configured to control the sixth switch SW6 and the seventh switch SW7. In this way, it is possible to cut off the supply of the electric power to the load 400.

Further, in this case, the control unit 150 may be configured to control the sixth switch SW6 and the seventh switch SW7 such that, when the load 400 is connected to the positive electrode-side output terminal 141 and the negative electrode-side output terminal 142, the sixth switch SW6 and the seventh switch SW7 are closed, as shown in FIG. 3 to FIG. 6, and when the load 400 is not connected to the positive electrode-side output terminal 141 and the negative electrode-side output terminal 142, the sixth switch SW6 and the seventh switch SW7 are opened. In this way, when the load 400 is not connected to the positive electrode-side output terminal 141 and the negative electrode-side output terminal 142, the positive electrode-side output terminal 141 and the negative electrode-side output terminal 142 can be separated from the first battery 210 and the second battery 220.

<Second Switch SW2, Third Switch SW3>

Figure 9:
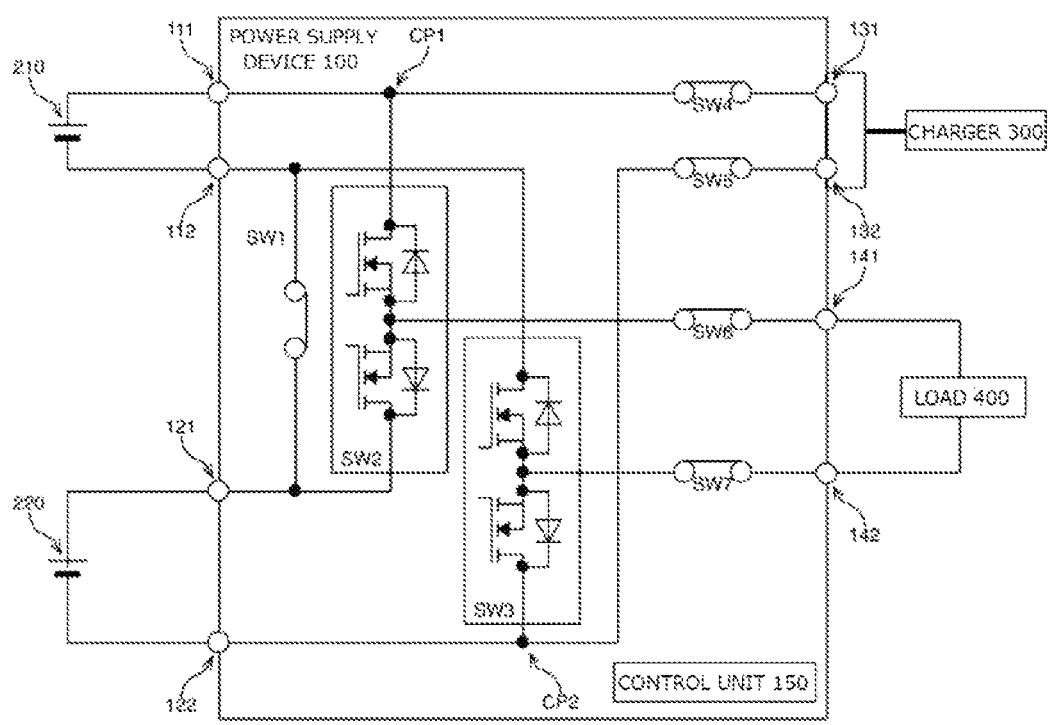
FIG. 9 is a diagram illustrating a power supply device 100 according to one embodiment of the present invention.

As shown in FIG. 9, the second switch SW2 and the third switch SW3 may be constituted of two switching elements (e.g., MOSFETs (Metal-Oxide-Semiconductor Field-Effect Transistors) connected in series, the switching element including a diode connected in parallel. In this case, the positive electrode-side output terminal 141 may be connected to a line that connects the two switching elements constituting the second switch SW2, and the negative electrode-side output terminal 142 may be connected to a line that connects the two switching elements constituting the third switch SW3.

Further, in the second switch SW2, a forward direction of the diode connected in parallel to the switching element located on the first connection point CP1 side may be a direction from the switching element located on the second positive electrode-side battery terminal 121 side to the first connection point CP1, and a forward direction of the diode connected in parallel to the switching element located on the second positive electrode-side battery terminal 121 side may be a direction from the switching element on the first connection point CP1 side to the second positive electrode-side battery terminal 121.

Further, in the third switch SW3, a forward direction of the diode connected in parallel to the switching element located on the first negative electrode-side battery terminal 112 side may be a direction from the switching element located on the second connection point CP2 side to the first negative electrode-side battery terminal 112, and a forward direction of the diode connected in parallel to the switching element located on the second connection point CP2 side may be a direction from the switching element located on the first negative electrode-side battery terminal 112 side to the second connection point CP2.

In this way also, it is possible to provide the power supply device that can adapt to the plurality of chargers without requiring interruption of operation of the load.

Figure 10:
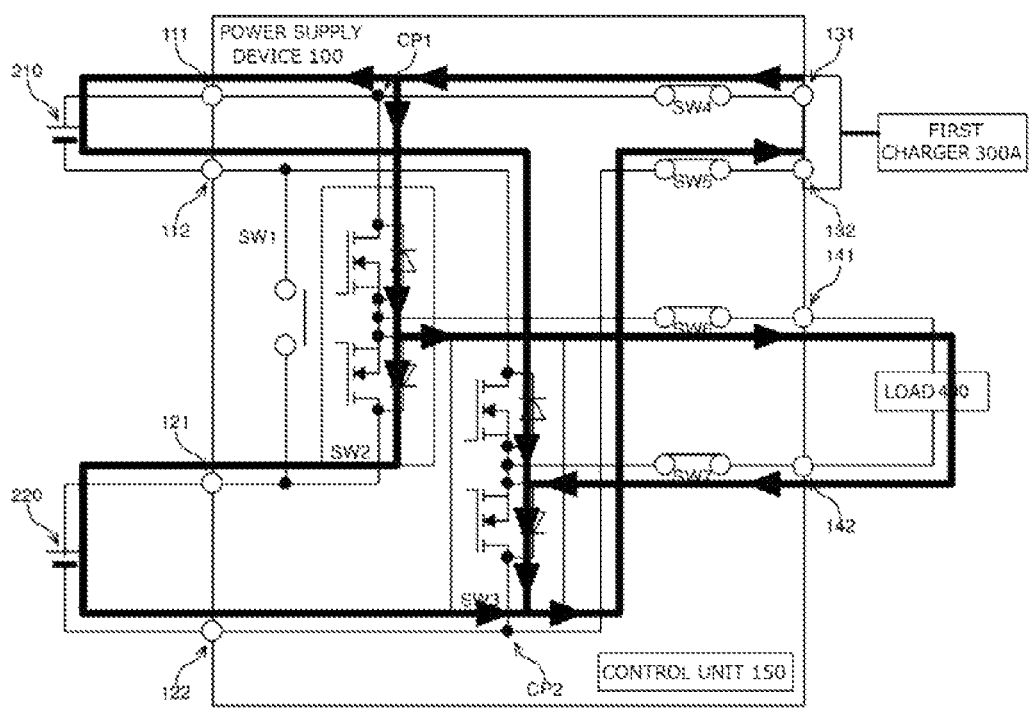
FIG. 10 is a diagram for explaining a flow of electric power in the power supply device 100.

The control unit 150 may be configured to control the first to third switches SW1-SW3 such that, for example, when the first charger 300A is connected to the positive electrode-side input terminal 131 and the negative electrode-side input terminal 132, the first switch SW1 is opened, the two switching elements of the second switch SW2 are turned on, and the two switching elements of the third switch SW3 are turned on. In this way, the first battery 210 and the second battery 220 can be connected in parallel as shown in FIG. 10, so it is possible to supply the electric power with the first voltage from the first charger 300A to the first battery 210 and to the second battery 220.

Further, the control unit 150 may be configured to control the first to third switches SW1-SW3 such that, for example, when the second charger 300B is connected to the positive electrode-side input terminal 131 and the negative electrode-side input terminal 132, the first switch SW1 is opened, one of the two switching elements of the second switch SW2 is turned on, and one of the two switching elements of the third switch SW3 is turned on.

Figure 11:
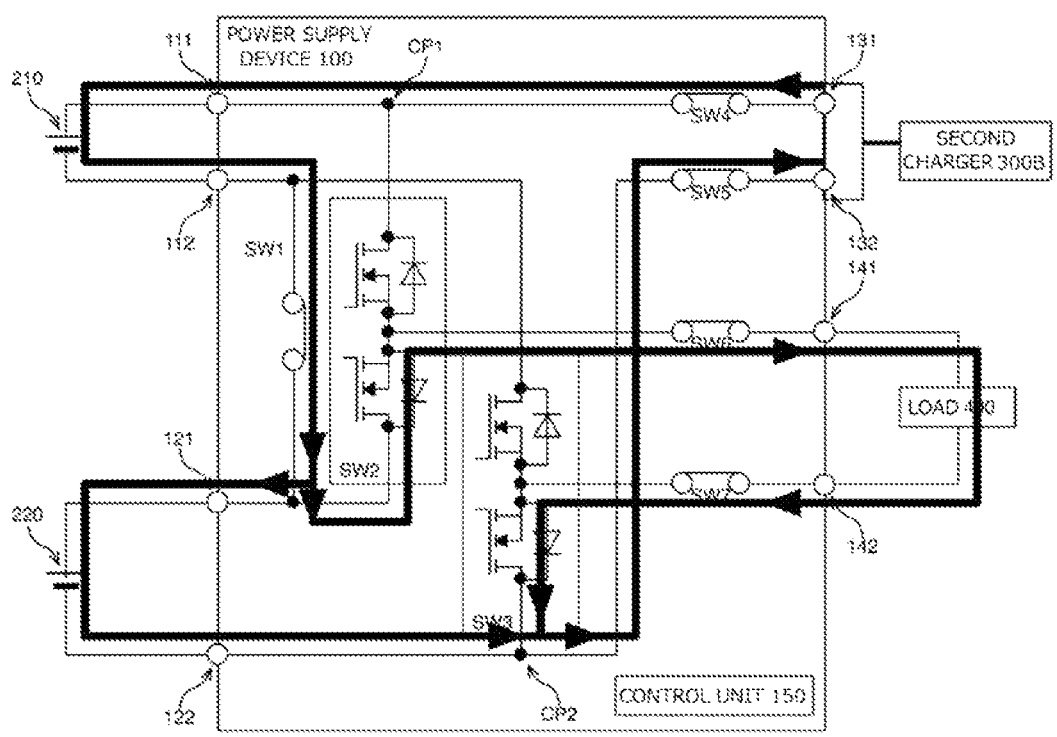
FIG. 11 is a diagram for explaining a flow of electric power in the power supply device 100.

In the example shown in FIG. 11, controlling is performed such that the switching element of the two switching elements of the second switch SW2 which is located on the second positive electrode-side battery terminal 121 side is turned on, the switching element of the two switching elements of the second switch SW2 which is located on the first connection point CP1 side is turned off, the switching element of the two switching elements of the third switch SW3 which is located on the second connection point CP2 side is turned on, and the switching element of the two switching elements of the third switch SW3 which is located on the first negative electrode-side battery terminal 112 side is turned off. Thus, in the example shown in FIG. 11, the load 400 is applied with the voltage of the second battery 220, so the load 400 is supplied with the electric power with the voltage of the second battery 220 that has the same drive voltage as the load 400.

Figure 12:
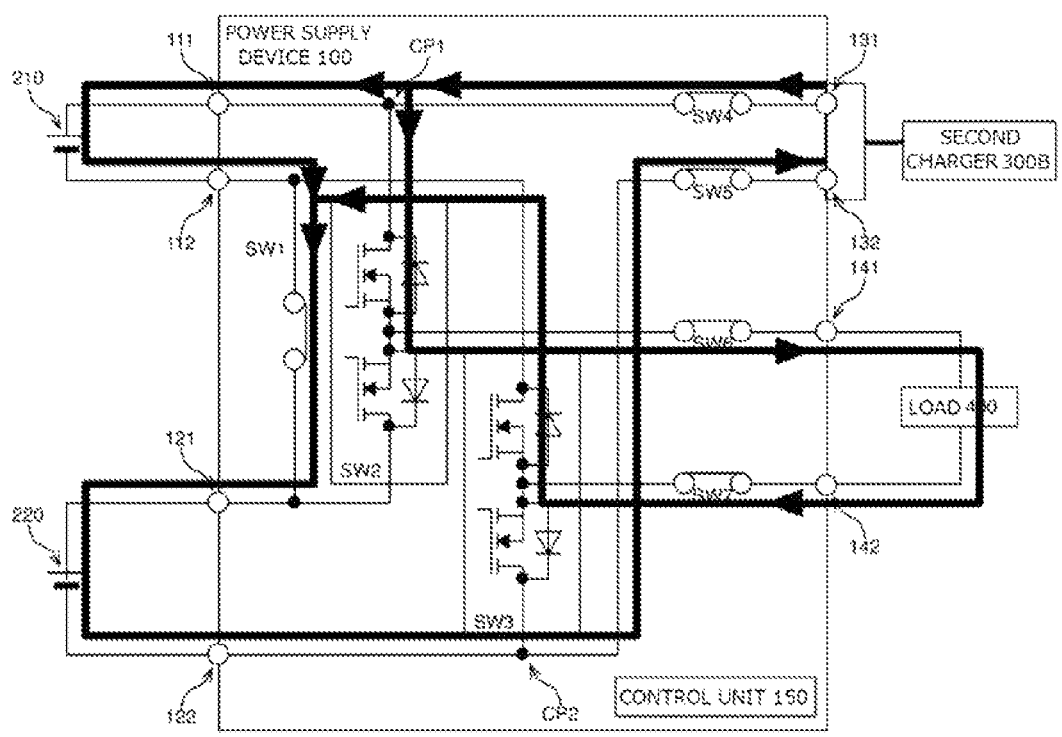
FIG. 12 is a diagram for explaining a flow of electric power in the power supply device 100.

In the example shown in FIG. 12, the switching element of the two switching elements of the second switch SW2 which is located on the first connection point CP1 side is turned on, the switching element of the two switching elements of the second switch SW2 which is located on the second positive electrode-side battery terminal 121 side is turned off, the switching element of the two switching elements of the third switch SW3 which is located on the first negative electrode-side battery terminal 112 side is turned on, and the switching element of the two switching elements of the third switch SW3 which is located on the second connection point CP2 side is turned off. Thus, in the example shown in FIG. 12, the load 400 is applied with the voltage of the first battery 210, so the load 400 is supplied with the electric power with the voltage of the first battery 210 that has the same drive voltage as the load 400.

Figure 13:
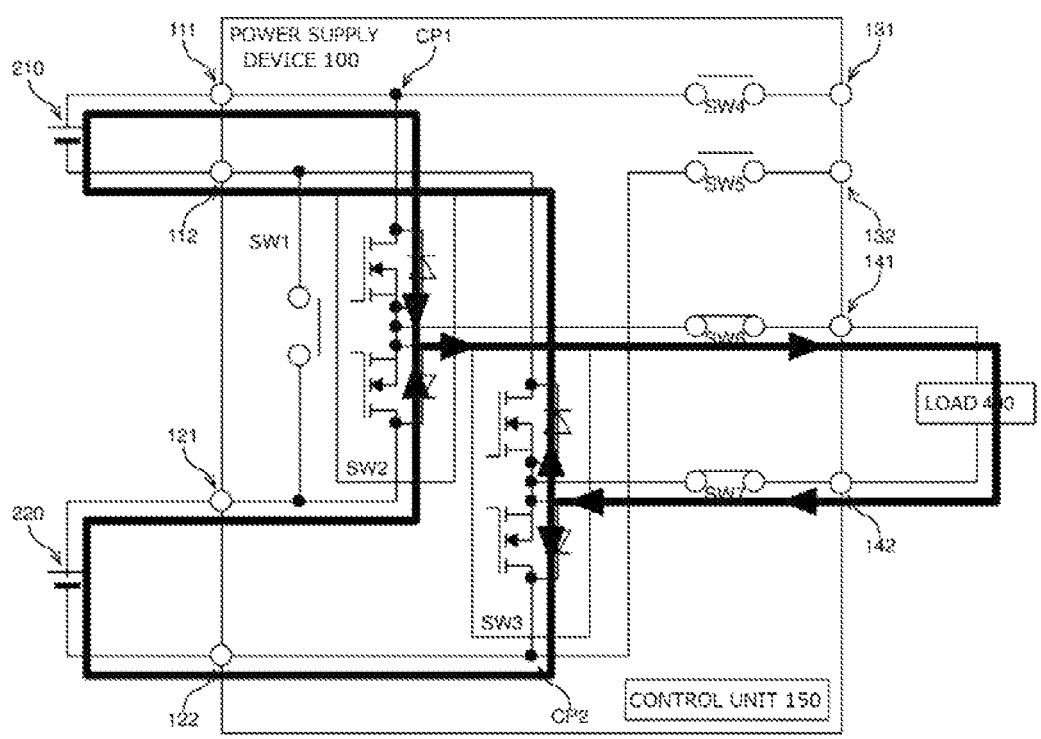
FIG. 13 is a diagram for explaining a flow of electric power in the power supply device 100.

Further, when the charger 300 is not connected to the positive electrode-side input terminal 131 and the negative electrode-side input terminal 132 (for example, during traveling), the control unit 150 may, for example, control the first to third switches SW1-SW3 such that the first switch SW1 is opened, the two switching elements of the second switch SW2 are turned on, and the two switching elements of the third switch SW3 are turned on. In this way, the first battery 210 and the second battery 220 are connected in parallel as shown in FIG. 13, so it is possible to supply the electric power from the first battery 210 and the second battery 220 whose drive voltages are the same as that of the load 400.

The present invention has been described above with reference to the preferred embodiments of the present invention. Although the present invention has been described with reference to the specific examples, various modifications and changes can be made to these specific examples without departing from the spirit and scope of the present invention as set forth in the claims.

LIST OF REFERENCE SIGNS 100 power supply device
111 first positive electrode-side battery terminal
112 first negative electrode-side battery terminal
121 second positive electrode-side battery terminal
122 second negative electrode-side battery terminal
131 positive electrode-side input terminal
132 negative electrode-side input terminal
141 positive electrode-side output terminal
142 negative electrode-side output terminal
150 control unit
SW1 first switch
SW2 second switch
SW3 third switch
210 first battery
220 second battery
300 charger
300A first charger
300B second charger
400 load

What is claimed is:

1. A power supply device comprising:
a first positive electrode-side battery terminal and a first negative electrode-side battery terminal for connecting a battery;
a second positive electrode-side battery terminal and a second negative electrode-side battery terminal for connecting a battery;
a positive electrode-side input terminal and a negative electrode-side input terminal for connecting a charger;
a positive electrode-side output terminal and a negative electrode-side output terminal for connecting a load;
a first switch;
a second switch; and
a third switch, wherein
the positive electrode-side input terminal is connected to the first positive electrode-side battery terminal,
the negative electrode-side input terminal is connected to the second negative electrode-side battery terminal,
the first switch is connected between the first negative electrode-side battery terminal and the second positive electrode-side battery terminal,
the second switch is connected between a first connection point and the second positive electrode-side battery terminal, the first connection point being between the positive electrode-side input terminal and the first positive electrode-side battery terminal,
the third switch is connected between the first negative electrode-side battery terminal and a second connection point, the second connection point being between the negative electrode-side input terminal and the second negative electrode-side battery terminal,
the positive electrode-side output terminal is connected to a line that connects the second switch and the second positive electrode-side battery terminal, and
the negative electrode-side output terminal is connected to a line that connects the negative electrode-side input terminal and the second negative electrode-side battery terminal.

2. The power supply device according to claim 1, further comprising a control unit configured to control the first switch, the second switch and the third switch, wherein
the control unit is configured to control the first switch, the second switch and the third switch such that the first switch is opened and the second switch and the third switch are closed when
a first battery with a drive voltage that is a first voltage is connected to the first positive electrode-side battery terminal and the first negative electrode-side battery terminal,
a second battery with a drive voltage that is the first voltage is connected to the second positive electrode-side battery terminal and the second negative electrode-side battery terminal,
a first charger that supplies electric power with the first voltage is connected to the positive electrode-side input terminal and the negative electrode-side input terminal, and a load with a drive voltage that is the first voltage is connected to the positive electrode-side output terminal and the negative electrode-side output terminal.

3. The power supply device according to claim 2, wherein the control unit is configured to control the first switch, the second switch and the third switch such that the first switch is closed and the second switch and the third switch are opened when
- the first battery is connected to the first positive electrode-side battery terminal and the first negative electrode-side battery terminal,
- the second battery is connected to the second positive electrode-side battery terminal and the second negative electrode-side battery terminal,
- a second charger that supplies electric power with a second voltage is connected to the positive electrode-side input terminal and the negative electrode-side input terminal, the second voltage being a voltage twice the first voltage, and
- the load is connected to the positive electrode-side output terminal and the negative electrode-side output terminal.

4. The power supply device according to claim 3, wherein the control unit is configured to control the first switch, the second switch and the third switch such that the first switch is opened and the second switch and the third switch are closed when
- the first battery is connected to the first positive electrode-side battery terminal and the first negative electrode-side battery terminal,
- the second battery is connected to the second positive electrode-side battery terminal and the second negative electrode-side battery terminal,
- a charger is not connected to the positive electrode-side input terminal and the negative electrode-side input terminal, and
- the load is connected to the positive electrode-side output terminal and the negative electrode-side output terminal.

5. A power supply device comprising:
- a first positive electrode-side battery terminal and a first negative electrode-side battery terminal for connecting a battery;
- a second positive electrode-side battery terminal and a second negative electrode-side battery terminal for connecting a battery;
- a positive electrode-side input terminal and a negative electrode-side input terminal for connecting a charger;
- a positive electrode-side output terminal and a negative electrode-side output terminal for connecting a load;
- a first switch;
- a second switch; and
- a third switch, wherein
- the positive electrode-side input terminal is connected to the first positive electrode-side battery terminal,
- the negative electrode-side input terminal is connected to the second negative electrode-side battery terminal,
- the first switch is connected between the first negative electrode-side battery terminal and the second positive electrode-side battery terminal,
- the second switch is connected between a first connection point and the second positive electrode-side battery terminal, the first connection point being between the positive electrode-side input terminal and the first positive electrode-side battery terminal,
- the third switch is connected between the first negative electrode-side battery terminal and a second connection point, the second connection point being between the negative electrode-side input terminal and the second negative electrode-side battery terminal,
- the positive electrode-side output terminal is connected to a line that connects the positive electrode-side input terminal and the first positive electrode-side battery terminal, and
- the negative electrode-side output terminal is connected to a line that connects the first negative electrode-side battery terminal and the third switch.

6. A power supply device comprising:
- a first positive electrode-side battery terminal and a first negative electrode-side battery terminal for connecting a battery;
- a second positive electrode-side battery terminal and a second negative electrode-side battery terminal for connecting a battery;
- a positive electrode-side input terminal and a negative electrode-side input terminal for connecting a charger;
- a positive electrode-side output terminal and a negative electrode-side output terminal for connecting a load;
- a first switch;
- a second switch; and
- a third switch, wherein
- the positive electrode-side input terminal is connected to the first positive electrode-side battery terminal,
- the negative electrode-side input terminal is connected to the second negative electrode-side battery terminal,
- the first switch is connected between the first negative electrode-side battery terminal and the second positive electrode-side battery terminal,
- the second switch is connected between a first connection point and the second positive electrode-side battery terminal, the first connection point being between the positive electrode-side input terminal and the first positive electrode-side battery terminal,
- the third switch is connected between the first negative electrode-side battery terminal and a second connection point, the second connection point being between the negative electrode-side input terminal and the second negative electrode-side battery terminal,
- the second switch and the third switch are constituted of two switching elements connected in series,
- the positive electrode-side output terminal is connected to a line that connects the two switching elements constituting the second switch, and
- the negative electrode-side output terminal is connected to a line that connects the two switching elements constituting the third switch.

7. The power supply device according to claim 6, wherein
- the two switching elements constituting the second switch are a switching element to which a diode is connected in parallel,
- the two switching elements constituting the third switch is a switching element to which a diode is connected in parallel,
- for the two switching elements constituting the second switch, a forward direction of the diode connected in parallel to the switching element located on the first connection point side is a direction from the switching element located on the second positive electrode-side battery terminal side to the first connection point,
- for the two switching elements constituting the second switch, a forward direction of the diode connected in parallel to the switching element located on the second positive electrode-side battery terminal side is a direction from the switching element located on the first connection point side to the second positive electrode-side battery terminal, for the two switching elements constituting the third switch, a forward direction of the diode connected in parallel to the switching element located on the first negative electrode-side battery terminal side is a direction from the switching element located on the second connection point side to the first negative electrode-side battery terminal, and for the two switching elements constituting the third switch, a forward direction of the diode connected in parallel to the switching element located on the second connection point side is a direction from the switching element located on the first negative electrode-side battery terminal side to the second connection point.

8. The power supply device according to claim 7, further comprising a control unit configured to control the first switch, the second switch and the third switch, wherein the control unit is configured to control the first switch, the second switch and the third switch such that the first switch is closed, one of the two switching elements constituting the second switch is turned on, another one of the two switching elements constituting the second switch is turned off, one of the two switching elements constituting the third switch is turned on, and another one of the two switching elements constituting the third switch is turned off, when a first battery with a drive voltage that is a first voltage is connected to the first positive electrode-side battery terminal and the first negative electrode-side battery terminal, a second battery with a drive voltage that is the first voltage is connected to the second positive electrode-side battery terminal and the second negative electrode-side battery terminal, a second charger that supplies electric power with a second voltage is connected to the positive electrode-side input terminal and the negative electrode-side input terminal, the second voltage being a voltage twice the first voltage, and a load with a drive voltage that is the first voltage is connected to the positive electrode-side output terminal and the negative electrode-side output terminal.

9. The power supply device according to claim 8, wherein the control unit is configured to control the first switch, the second switch and the third switch such that the first switch is opened and the second switch and the third switch are closed when the first battery is connected to the first positive electrode-side battery terminal and the first negative electrode-side battery terminal, the second battery is connected to the second positive electrode-side battery terminal and the second negative electrode-side battery terminal, a first charger that supplies electric power with the first voltage is connected to the positive electrode-side input terminal and the negative electrode-side input terminal, and the load is connected to the positive electrode-side output terminal and the negative electrode-side output terminal.

10. The power supply device according to claim 9, wherein the control unit is configured to control the first switch, the second switch and the third switch such that the first switch is opened and the second switch and the third switch are closed when the first battery is connected to the first positive electrode-side battery terminal and the first negative electrode-side battery terminal, the second battery is connected to the second positive electrode-side battery terminal and the second negative electrode-side battery terminal, a charger is not connected to the positive electrode-side input terminal and the negative electrode-side input terminal, and the load is connected to the positive electrode-side output terminal and the negative electrode-side output terminal.

\* \* \* \* \*